3,338,793
METHOD FOR PRODUCTION OF L-GLUTAMIC ACID BY MICROBACTERIA

Sotoo Yamamoto, Tetsukazu Goto, and Takeyoshi Ohsawa, Nobeoka-shi, Miyazaki-ken, Japan, assignors to Asahi Kasei Kogyo Kabushiki Kaisha, Osaka, Japan
No Drawing. Filed Sept. 18, 1964, Ser. No. 397,629
3 Claims. (Cl. 195—47)

This invention relates to a method of cultivating bacteria belonging to *Microbacterium ammoniaphilum* areobically in a nutrient culture medium having molasses as the main component, and thereby accumulating an appreciable amount of L-glutamic acid in said culture medium. The object of this invention is to provide L-glutamic acid which is important as a chemical condiment or as a monomer for poly-amino acid fibers economically on a commercial basis.

More particularly, this invention is constructed of the below-mentioned two characteristic features, in producing L-glutamic acid in a nutrient culture medium having cane molasses as the main carbohydrate source by the fermentation method utilizing L-glutamic acid-producing bacteria, *Microbacterium ammonaphilum*, which require biotin. The first characteristic feature lies in using L-glutamic acid-producing bacteria designated as *Microbacterium ammoniaphilum* belonging to the new species, and the second characteristic feature lies in adding surface active agents selected respectively from the first and the second-component chemical agents in two steps at an appropriate time in order to normally carry out the production of L-glutamic acid by fermentation.

Hereunder, a detailed statement is given as to a typical strain, which has a strong ability to produce L-glutamic acid, of the *Microbacterium ammoniaphilum* mentioned in the first characteristic feature above. This strain was deposed with the American Type Culture Collection under date of Feb. 12, 1964, and has been recorded as ATCC No. 15354. In the testing of said strain, the same microscopic observation as in the "Manual of Microbiological Methods by the Society of American Bacteriologists (1957)" was followed to obtain the following results.

(I) Microscopic observation:
 (1) Morphological characteristics
  Vegetative cells: rods; usually $0.6$–$0.8\mu$ x $1.0$–$2.5\mu$; slight Pleomorphism; in one scope, observed club-shape, slightly curved and swollen; observed angular, palisade and Chinese letter based on a snapping division; not observed branching; not observed life cycle or bud formation in each age of fermentation.
 (2) Gram stain: positive, not change the dyeability in each ago of fermentation.
 (3) Spore formation: none
 (4) Flagella: none
 (5) Small granules (Refrel's or Albert's method): observed clearly at both poles of cell, in some cases observed at only one pole.
 (6) Motility: none.
 (7) Acid-fast stain: negative.
(II) Cultural characteristics:
 (1) Agar colonies
  Growth: be fairly late, after 24 hrs. makes colonies having 0.5–1 mm. of dia., after duration in the culture increase the magnitude, colonies: small circle, edge: entire, slightly raised, surface: slightly dryish-smooth, opaque, and lemon yellow which increases with ageing.
 (2) Agar stroke
  Growth: Excellent.
  Form of growth: Filiform.
  Odour: Absent.
  Colour of medium: Unchanged.
 (3) Agar stab and Thioglycollate medium stab: grow only on surface, aerobic.
 (4) Nutrient broth: moderate growth with formation of membranous sediment after growth, odourless.
 (5) Blood agar: hemolytic creaction: none.
 (6) Löffler medium: abundant growth.
 (7) Blood tellurite medium: black colonies.
 (8) Potato medium: colonies: lemon yellow from initial culture.
(III) Physiological characteristics:
 (1) Temperature relations:
  Optimum temperature: 25–35° C.
  Thermal resistance: survives for ½ hour at 70° C. and ¼ hour at 72° C. in skim-milk culture.
 (2) Catalase reaction: positive.
 (3) Nitrite production from nitrate: none.
 (4) Production of hydrogen sulfide: none.
 (5) Indol production: negative.
 (6) M.R. reaction: positive.
 (7) V.P. reaction: negative.
 (8) Growth in Koser's medium: none.
 (9) Growth in Hucker's medium: none.
 (10) Urease: positive.
 (11) Gelatin stab: none.
 (12) Hydrolysis of starch: none.
 (13) Litmus milk culture: unchanged.
 (14) Formation of ammonia: not derivable from peptone.
 (15) Utilization of cellulose: none.
 (16) Methylene blue reduction: positive.
 (17) Pigment formed: Lemon yellow, water insoluble, not changed colour of medium.
 (18) Fermentation of various sugars: acid production with quick decomposition from glucose, fructose, sucrose, maltose, and mannose; acid production with late decomposition from threhalose, inositol, and aesculin; no acid production from lactose, xylose, arabinose, rhamnose, raffinose, galactose, glycerol, adonitol, mannitol, dulcitol, sorbitol, salicin dextrin, starch, inulin and blycogen; no gas production from any sugars.
 (19) Actiological properties: not germ of guinea pig or mouth disease.
 (20) Nutrition-requesting nature: biotin-requesting and cystine.
 (21) Observed lactic acid in a medium in a stand culture containing glucose in its medium.

In order to make species different from said *Microbacterium ammoniaphilum* No. 2001 from L-glutamic acid producing bacteria, the inventors of this strain have already obtained several strains which have close resemblance to microbiological characteristics, e. g. out of sugar utilization by No. 2109 strain, acid production from escrin is different and the form of agar flat colony is a little different, but other properties are exactly the same as those of No. 2001 strain. It is considered that L-glutamic acid producing bacteria belonging to *Microbacterium ammoniaphilum* are spread widely in the natural world. It is crystal clear in view of the above-said characteristics of *Microbacterium ammoniaphilum* in accordance with "Bergey's Manual of Determinative Bacteriology" (1957) 7th ed. published by the Society of American Bacteriologists that the strain *Microbacterium ammoniaphilum* belonging to the order Eubacteriales, because the strain is a bacterium of which characters are the following, i.e., gram strain: positive, spore formation: none, acid-fast strain: negative, hight pleomorphism, angular and palisade: observed clearly. From the fact that among the families of aforesaid known L-glutamic acid producing microorganisms, the family Micrococcuseae is coccoi or egg-shaped having no thermal-resistance, the family Brevibacteriaceae has no pleomorphism and no thermal-resistance and the family Baccilluseae has spore formation, it is concluded that the strain of the invention belongs to none of the above families and that the strain of the invention should belong to the family Corynebacteriaecae. And further, it is clearly concluded from the following facts (1)–(7) in careful comparison with genuses belonging to the family of Corynebacteriaecae cited in Bergey's Manual that the strain of the invention should belong to the genus Microbacterium.

(1) It is denied that the strain of the invention belongs to the genus Listeria because of its non-motility.
(2) Also denied that genus Erysipelothrix because its catalase reaction is positive and the strain grows in aerobic condition.
(3) Further denied the genus Cellulomonas because the strain has non-utilization of cellulose.
(4) Still further denied the genus Arthrobacter because morphological change in life cycle and change of gram stain in each age of fermentation are not observed.
(5) Etiological nature and high nutrient-requesting nature as in the genus Corynebacterium are not observed, but the nutrient-requesting nature of the strain is higher than the same nature of the genus Cellulomonas and Arthrobactor (both are soil microorganisms), that is, the strain is cystine- and biotin-requesting.
(6) The strain produces lactic acid in a medium in a stand culture.
(7) The strain bears up against heating for 30 minutes at 70° C. or for 15 minutes at 72° C.

As regards species, the species of the invention differs from both *Microbacterium lacticum* and *Microbacterium flavum* which are described as species belonging to the genus Microbacterium in Bergey's Manual, in view of the difference in the starch and maltose decomposition natures which are considered as the identification key of the both species. And further, both *Microbacterium lacticum* ATCC No. 8180 and *Microbacterium flavum* ATCC No. 10340 which have been deposited as a standard strain belonging to the genus Microbacterium at the American Type Culture Collection and have been given the numbers, have no ability of producing L-glutamic acid. On the contrary, the strain of the invention has a remarkable ability of producing and accumulating L-glutamic acid by culturing the strain under aerobic conditions in a medium containing carbohydrate, nitrogen source and other nutrients.

In general, in cases where L-glutamic acid is attempted to be produced by fermenting cane molasses with L-glutamic acid-producing bacteria, if a mere nutrient culture medium having molasses as the main component is used, the object cannot be accomplished because of biotin active element present in the cane molasses. This is the same even in the case of *Microbacterium ammonaphilum* having the above said property in this invention.

So far, many attempts were made, and some succeeded, in respect of the L-glutamic fermentation in a nutrient culture medium consisting of such carbohydrate materials. As a typical method thereof, there is the invention applied for by Merck & Co. (U.S. Patent No. 3,080,297). The technical essence thereof is a method of adding an inhibitor selected from among the antimicrobial agents consisting mainly of antibiotics to a culture medium.

However, even with the method mentioned above, it was found dfficult to obtain an effect sufficient for industrial practice. Based on this fact, the present inventors made various studies of the action of chemical substances to be added to a culture medium or to the medium under cultivation they have derived this invention, which is, particularly, constructed of a novel technique of adding different chemical agents in two steps to a culture medium. The effect of the two-step addition is shown in Table 1 below in respect of the case of several surface active agents.

TABLE 1

| Name of Surface Active Agents | 1 Step Addition | | | 2 Step Addition | | |
|---|---|---|---|---|---|---|
| | Amount added (g./dl.) | Time of Addition (hrs.) | Amount of L-Glutamic Acid formed (mg./ml.) | Amount added (g./dl.) | Time of Addition (hrs.) | Amount of L-Glutamic Acid formed (mg./ml.) |
| Tween 40 | 0.2 | 0 | 12.1 | 0.03 / 0.03 | 0 / 8 | 21.0 |
| Catiolita SA | | | | | | |
| Emanon 3115 | 0.2 | 0 | 11.5 | 0.10 / 0.01 | 0 / 8 | 22.0 |
| Acetamine | | | | | | |
| Aminone 295 | 0.01 | 0 | 12.3 | 0.02 / 0.01 | 0 / 8 | 18.3 |
| Cation A.B. | | | | | | |

Composition of culture medium for the main fermentation:
Cane molasses 9 g., urea 1.2 g., $KH_2PO_4$ 0.1 g. per dl.
Composition of cane molasses used:
Total carbohydrate 54.47 g./dl., dilect reducing sugar 10.28 g./dl., biotin 98.6 mg./100 g.
Culture condition: 30° C., 48 hrs., shaking culture.

As shown in Table 1, the method of this invention based on the two-step addition system, as compared with the hitherto-known methods based on the one-step addition system, makes it possible to appreciably increase the formation of L-glutamic acid and, what is more, to make the amount of chemical agents to be added small, and, therefore, there is the advantage that the method of this invention can be worked economically on a commercial basis.

In the practice of this invention, chemical agents are added in two steps to a culture medium or to the medium under cultivation. As the chemical agents to be added in the first step, there are non-ionic surface active agents, which are selected from the group consisting of esters of polyoxyethylene sorbitan fatty acid, polyoxyethylene fatty acid, etc. and polyoxyethylene alkylamine. The chemical agents to be added in the second step are selected from the group of compounds such as surface active agents and antibiotics. The use of chemical agents having the components shown below is particularly effective.

*Components of the chemical agents to be added in the first step*

Polyoxyethylene sorbitan monopalmitate
Polyoxyethylene sorbitan monostearate
Polyoxyethylene monostearate
Polyoxyethylene monopalmitate
Polyoxyethylene alkylamine, etc.

*Components of the chemical agents to be added in the second step*

Lauryl amine, Stearyl amine, palmityl amine, alkyl trimethyl ammonium chloride, alkyl dimethyl benzyl ammonium chloride, penicillin, erythromycin, leucomycin, synthetic penicillin derivative, streptomycin, etc.

Of these chemical agents, those which are used in the first step are added within several hours after commencement of culture, that is, at the time when the difference shows 0–0.6 between the optical density, as in the case in which the twenty-times diluted culture broth is measured with a wave length of 655m$\mu$ by using an ordinary photoelectric colorimeter with a 10 mm. cell, and the optical density at the time the culture is commenced. And, those which are used in the second step are added after lapse of more than one hour from the time the first component was added. The above-mentioned difference in optical density at this time is preferably 0.4–1.0

The molasses referred to herein is cane molasses.

The strain used in this invention, a typical one of which is ATCC 15354 strain, has several color mutants, which have the same characteristic features in taxology as those mentioned above. Accordingly, the strain which is made the objective of this invention is fully effective, regardless of whether its mutant is natural or artificial.

Hereunder, the method of this invention is explained with working examples, which examples, however, are just several of those carried out by using *Microbacterium ammoniaphilum* ATCC 15354 strain and do not restrict this invention in any way whatsoever.

EXAMPLE 1

*Microbacterium ammoniaphilum* ATCC 15354 pre-cultured at 30° C. in a nutrient culture medium was inoculated into 10 l. of the main fermentation culture medium having the following composition, and fermentation of glutamic acid was carried out at 30° C. under aerobical stirring conditions.

Composition of the main fermentation culture medium:

|  | G./dl. |
|---|---|
| Cane molasses (as total carbohydrate) | 7 |
| $KH_2SO_4$ | 0.2 |
| $MgSO_4 \cdot 7H_2O$ | 0.05 |
| $MnSO_4 \cdot 4H_2O$ | 0.0005 |
| $(NH_4)_2SO_4$ | 0.05 |

As the first-component surface active agent, one having polyoxyethylene monopalmitate as the main component was selected and, when the optical density of the culture medium measured by the aforesaid method was 0.3, i.e. after about 5 hours from the time the culture was commenced, it was added to the culture medium so that the concentration thereof became 0.1 g./dl. And, as the second-component surface active agent, one having lauryl amine as the main component was taken up and, in the 6th hour after commencement of culture when the optical density became 0.55, it was added to the culture medium so that the concentration thereof became 0.025 g./dl.

Also, the pH of the culture medium under cultivation was adjusted to 7–8 with ammonia gas. While the culture temperature was being maintained at 30° C., about 2.6 l. of a liquid of cane molasses having a carbohydrate concentration of 50 g./dl. was supplied from the 12th hour after commencement of culture so that the concentration of the remaining carbohydrate became 1 g./dl., and the culture was carried out for 36 hours. In the culture medium, there was observed the accumulation of L-glutamic acid with a concentration of 7.85 g./dl. The total amount of L-glutamic acid formed was 1015 g. and the amount of carbohydrate used was 1989 g.; that is, the rate of yield was 51%.

Against this, when the second component was not used, the concentration of L-glutamic acid was 1.85 g./dl., and the total amount of L-glutamic acid formed was only 225 g. After completion of culture, 795 g. of coarse L-glutamic acid crystals was obtained by the usual method from the former fermentation liquid.

EXAMPLE 2

The culture was carried out in the same way as in Example 1 by using the same *Microbacterium ammoniaphilum* ATTCC 15354 as in Example 1. However, the main fermentation culture medium used was of the following composition.

Composition of the main fermentation culture medium:

|  | G./dl. |
|---|---|
| Cane molasses (as total carbohydrate) | 7.0 |
| $KH_2PO_4$ | 0.2 |
| $MgSO_4 \cdot 7H_2O$ | 0.05 |
| $(NH_4)_2SO_4$ | 0.05 |
| $MnSO_4 \cdot 4H_2O$ | 0.0005 |

The pH adjustment and the supply of carbohydrate were carried out in the same way as in Example 1, but as the first-component surface active agent, one having polyoxyethylene sorbitan monopalmitate as the main component was used; it was added to the culture medium so that the concentration thereof became 0.1 g./dl. in the 4th hour after commencement of culture when the optical density of the culture medium was 0.3. Also, as the second component, a surface active agent having lauryl amine as the main component was added to the culture medium so that the concentration thereof became 0.025 g./dl. when the optical density was 0.60, i.e. after lapse of 5.5 hours from the time the culture was commenced, and the culture was continued for 36 hours.

In the culture medium, there was observed the accumulation of L-glutamic acid with a concentration of 7.63 g./dl. The total amount of L-glutamic acid produced was 958 g. Against this, when the second component was not added, the concentration of L-glutamic acid was 1.12 g./dl. and the total amount produced was only 165 g.

EXAMPLE 3

1.5 ml. of the culture broth pre-cultured by using the same *Microbacterium ammoniaphilum* ATCC 15354 as in Example 1 was inoculated into 75 ml. of the culture medium having the following composition placed in a 500 ml. shaking flask.

Composition of the main fermentation culture medium:

|  | G./dl. |
|---|---|
| Cane molasses treated with ammonium phosphate (as total carbohydrate) | 7.0 |
| $KH_2PO_4$ | 0.2 |
| $MgSO_4 \cdot 7H_2O$ | 0.05 |
| Urea | 1.4 |
| $MnSO_4 \cdot 4H_2O$ | 0.0005 |
| Surface active agent having polyoxyethylene sorbitan monostearate as main component | 0.15 |

In the 6th hour after commencement of culture, a surface active agent having palmityl amine as the main component was added as the second component in a ratio of 0.015 g./dl., and the culture was carried out for 48 hours at 30° C. In the culture medium, there was observed the accumulation of L-glutamic acid with a concentration of 3.2 g./dl. On the other hand, when the second component was not added, there was the accumulation of L-glutamic acid with a concentration of only 1.5 g./dl.

However, the analytical values of the cane molasses treated with ammonium phosphate used herein were as follows:

| | | |
|---|---|---|
| Total carbohydrate | g./dl. | 16.07 |
| Direct reducing sugar | g./dl. | 5.20 |
| Biotin | 100 cc. | 33.3 |

EXAMPLE 4

A dark-yellow color mutant of *Microbacterium ammoniaphilum* ATCC 15354 was cultured in a 500 ml. shaking flask in the same way as in Example 3. However, the culture medium used was of the following composition.

Composition of the main fermentation culture medium:

| | G./dl. |
|---|---|
| Cane molasses (as total carbohydrate) | 7.0 |
| KH$_2$PO$_4$ | 0.2 |
| MgSO$_4$·7H$_2$O | 0.05 |
| Urea | 1.5 |
| MnSO$_4$·4H$_2$O | 0.0005 |
| Polyoxyethylene monostearate | 0.2 |

The culture was carried out on a shaker for 48 hours. In the 6th hour after commencement of culture, a second-componet surface active agent having alkyl trimethyl ammonium chloride as the main component was added to the culture medium so that the amount thereof became 0.01 g./dl. In the culture medium after 48 hours, there was observed the accumulation of L-glutamic acid with a concentration of 3.3 g./dl.

Against this, when the second component was not added, there was observed the formation of L-glutamic acid with a concentration of only 2.3 g./dl.

The analytical values of the cane molasses used herein were as follows:

| | | |
|---|---|---|
| Total carbohydrate | percent | 49.65 |
| Direct reducing sugar | do | 0.33 |
| Biotin | 100 g. | 36.5 |

EXAMPLE 5

*Microbacterium ammoniaphilum* ATTC 15354 was shake-cultured in a 500 ml. shaking flask in the same way as in Example 3. However, the main fermentation culture medium used was of the following composition:

| | G./dl. |
|---|---|
| Cane molasses (as total carbohydrate) | 7.0 |
| KH$_2$PO$_4$ | 0.2 |
| MgSO$_4$·7H$_2$O | 0.05 |
| Urea | 1.4 |
| MnSO$_4$·4H$_2$O | 0.0005 |
| Surface active agent having polyoxyethylene alkyl amine as main component | 0.20 |

As the second component, in the 6th hour after commencement of culture, a surface active agent having benzalkonium chloride as the main component was added at a ratio of 0.01 g./dl. to the culture medium. In the culture medium after 48 hours, there was observed the accumulation of L-glutamic acid with a concentration of 2.7 g./dl. against this, when the second component was not added, there was observed the formation of L-glutamic acid with a concentration of only 0.8 g./dl.

EXAMPLE 6

*Microbacterium ammoniaphilum* ATCC 15354 pre-cultured for 24 hours at 30° C. in a bouillon agar slant was inoculated into a seed culture medium consisting of the following composition, and shake-cultured for 28 hours at 30° C.

| | | |
|---|---|---|
| Corn steep liquer | ml./dl. | 4.0 |
| Amino acid liquid | ml./dl. | 4.0 |
| KH$_2$PO$_4$ | g./dl. | 0.1 |
| MgSO$_4$·7H$_2$O | g./dl. | 0.1 |

2 ml. thereof was inoculated into 100 ml. of the main culture medium having the following composition prepared in a 500 ml. shaking flask, and, while the pH under cultivation was being maintained at around 7 with urea water, the shaking culture was continued at 30° C.

| | G./dl. |
|---|---|
| Cane molasses | 10 |
| KH$_2$PO$_4$ | 0.1 |
| Polyoxyethylene sorbitan monopalmitate (Tween 40) | 02. |

In the 8th hour after commencement of culture, various antibiotics were added. The culture was further continued, and, after 48 hours' cultivation, the amount of L-glutamic acid in the culture medium was calculated by the manometric method of detecting the CO$_2$ generated in the enzymatic dicarboxylation of L-glutamic acid. The results are shown in Table 2. The reference in the table shows the results of production tests in the above-mentioned culture medium without, however, Tween 40.

TABLE 2

| Antibiotics | Method of This Invention | | Reference | |
|---|---|---|---|---|
| | Amount Added | L-GA Formed, mg./ml. | Amount Added | L-GA Formed, mg./ml. |
| Penicillin G | 5 unit/ml | 25.8 | 20 U/ml | 15.0 |
| Phenoxypenicillin | 5 U/ml | 21.4 | 20 U/ml | 14.6 |
| Penicillin V | 5 U/ml | 25.9 | 20 U/ml | 15.1 |
| Tetracyclin | 5 mcg./ml | 14.7 | 10 mcg./ml | 2.4 |
| Erythromycin | 1 mcg./ml | 14.2 | 10 mcg./ml | 5.0 |
| Leucomycin | 0.5 mcg./ml | 18.8 | 5 mcg./ml | 7.7 |

EXAMPLE 7

500 ml. of the bacterial seed of *Microbacterium ammoniaphilum* ATCC 15354 obtained in the same way as in Example 6 was inoculated into 10 l. of the culture medium (charged in 20 l. jar fermenter) for the main fermentation having the following composition:

| | G./dl. |
|---|---|
| Cane molasses (as total carbohydrate) | 10 |
| KH$_2$PO$_4$ | 0.1 |
| Polyoxyethylene sorbitane monopalmitate (Tween 40) | 0.05 |

In the 9th hour after commencement of culturing 3.0 g. of stearylamine acetate (Catiolite SA) was added. The culture was carried out under submerged aerobical conditions while adjusting the pH to 8.0 with ammonium liquid during culturing. The amount of L-glutamic acid accumulated in the cultue medium after 48 hrs. was 46.0 mg. per ml. Incidentally, L-glutamic acid can be collected from the culture broth in the same way as in Example 1.

EXAMPLE 8

Like in Example 6, *Microbacterium ammoniaphilum* ATCC 15354 was shake-cultured at 30° C. in a seed culture medium, and 500 ml. thereof was inoculated into a 20 l. jar fermenter containing 10 l. of the culture medium for main fermentation having the following composition:

| | G./dl. |
|---|---|
| Cane molasses treated with ammonium phosphate (as total carbohydrate) | 10 |
| $KH_2PO_4$ | 0.1 |
| $MgSO_4 \cdot 7H_2O$ | 0.05 |
| Polyoxyethylene alkylamine (Aminon 295) | 0.05 |

Separately, 50 g. of trimethyl octadecyl ammonium chloride (cation AB) was added in the 8th hour after commencement of culturing. The culture was carried out under submerged aerobical conditions for 40 hrs. at 30° C. while controlling the pH at 8 with ammonia gas.

In the culture medium, there was observed the occumulation of L-glutamic acid in an amount of 47.0 mg./ml.

The cane molasses treated with ammonium phosphate used as carbohydrate material had the following composition:

| | | |
|---|---|---|
| Total carbohydrate | g./dl | 16.07 |
| Direct reducing sugar | g./dl | 5.20 |
| Biotin | mcg./dl | 33.3 |

What is claimed is:

1. In the method for preparing L-glutamic acid by fermentation of carbohydrate materials by culturing microorganisms belonging to *Microbacteria ammoniphilum* in a nutrient culture medium containing cane molasses as the main component, an improvement comprising carrying out said fermentation in the presence of a nonionic surface active agent selected from the group comprising polyoxyethylene sorbitan monopalimitate, polyoxyethylene sorbitan monostearate polyoxyethylene monostearate, polyoxyethylene monopalmitate and polyoxyethylene alkylamine, subsequently adding a chemical agent selected from the second group comprising lauryl amine, stearyl amine, palmityl amine, alkyl trimethyl amine chloride, benzalconium chloride, penicillin, erythromycin, leucomycin streptomycin to the culture medium, continuing the culture aerobically, thereby forming and accumulating L-glutamic acid in the culture medium and isolating and collecting the same.

2. A method as defined in claim 1, wherein a nonionic surface active agent is used as the component of the culture medium.

3. A method as defined in claim 2, wherein a compound selected from the group consisting of ionic surface active agents and antibiotics is added during the time the growth of microbacteria has reached from the middle to the last period of the log. phase.

References Cited

UNITED STATES PATENTS

| 3,080,297 | 3/1963 | Phillips et al. | 195—47 |
| 3,164,531 | 1/1965 | Okada et al. | 195—47 |

FOREIGN PATENTS

| 683,022 | 3/1964 | Canada. |
| 683,023 | 3/1964 | Canada. |

A. LOUIS MONACELL, *Primary Examiner.*

L. M. SHAPIRO, *Assistant Examiner.*